United States Patent
Adriaansen et al.

(10) Patent No.: US 7,238,309 B2
(45) Date of Patent: Jul. 3, 2007

(54) EXTRUDED CERAMIC LOG TRANSFER SYSTEM

(75) Inventors: Scott L Adriaansen, Elmira, NY (US); Kim F Cobb-Cain, Corning, NY (US); Kevin B Sterner, Corning, NY (US)

(73) Assignee: Corning Incorporated, Corning, NY (US)

( * ) Notice: Subject to any disclaimer, the term of this patent is extended or adjusted under 35 U.S.C. 154(b) by 180 days.

(21) Appl. No.: 10/691,260

(22) Filed: Oct. 21, 2003

(65) Prior Publication Data

US 2005/0082705 A1    Apr. 21, 2005

(51) Int. Cl.
*B29C 47/92*   (2006.01)
*B28B 21/52*   (2006.01)
*B28B 21/92*   (2006.01)
*C04B 35/01*   (2006.01)
*B29C 47/00*   (2006.01)

(52) U.S. Cl. .................. 264/40.1; 264/630; 264/631; 264/280; 264/177.17; 264/209.3; 264/210.2

(58) Field of Classification Search .............. 264/40.1, 264/630, 631, 280, 177.17, 209.3, 210.2
See application file for complete search history.

(56) References Cited

U.S. PATENT DOCUMENTS

| | | | | |
|---|---|---|---|---|
| 2,352,442 A | * | 6/1944 | Loewy et al. ................. | 72/299 |
| 2,487,972 A | * | 11/1949 | Katz ............................ | 72/299 |
| 2,487,973 A | * | 11/1949 | Kent ............................ | 72/299 |
| 2,715,431 A | * | 8/1955 | Grossu ........................ | 72/299 |
| 4,319,840 A | * | 3/1982 | Kondo et al. ............ | 356/241.1 |
| 4,906,170 A | * | 3/1990 | Nelson et al. ................ | 425/94 |
| 5,205,991 A | * | 4/1993 | Avery et al. ................ | 422/129 |
| 5,222,594 A | * | 6/1993 | Sumino ....................... | 198/808 |
| 5,431,866 A | * | 7/1995 | DeMasters et al. ........ | 264/40.1 |
| 5,591,387 A | * | 1/1997 | Takeuchi et al. ............. | 264/86 |

* cited by examiner

*Primary Examiner*—Christina Johnson
*Assistant Examiner*—Matthew J. Daniels
(74) *Attorney, Agent, or Firm*—Kees van der Sterre; Robert L. Carlson

(57) ABSTRACT

An apparatus for orienting section of a plasticized ceramic extrudate includes a marking assembly for applying an orientation reference mark to a plasticized ceramic extrudate exiting an extrusion die onto an extrudate support, and at least one extrudate-contacting deformable roller having an axis of rotation, wherein the axis of rotation is pivotable with respect to a movement of the extrudate exiting an extrusion die, and wherein the roller is adapted to contact the extrudate and correct a corkscrew deformation of the extrudate exiting the extrusion die. The apparatus also includes at least one extrudate-contacting orientation control member for correcting the orientation of a cut section of the extrudate on the extrudate support in response to a misalignment of the reference mark. The apparatus further includes at least one gripping member adapted to laterally transfer the cut section of the extrudate along a linear path with respect to the extrudate support while preventing any orientation change of the cut section of the extrudate support, and a visual inspection apparatus adapted to confirm the orientation of the cut section of the extrudate on extrudate support.

5 Claims, 6 Drawing Sheets

EXTRUDED CERAMIC LOG TRANSFER SYSTEM

BACKGROUND OF THE INVENTION

The invention relates to an extruded ceramic log transfer system, and more specifically to an automated extruded ceramic log transfer system.

Extruded logs or extrudates of ceramic are used in a wide variety of applications, such as substrates for automotive exhaust catalytic converters, particulate traps within diesel engines, chemical filtration processes, and the like. The manufacturing process for these extrudates typically include the transfer of the wet log along a manufacturing line or cell subsequent to being extruded from an associated extrusion die.

Heretofore, this transfer is typically conducted via a manual process that requires an operator to physically touch the ceramic extrudate either hand-and/or a utensil. The forces as exerted by the operator onto the ceramic extrudate when touching the same are variable in nature and differ from operator to operator and part to part, thereby resulting in a non-uniform deformation of the extrudate during processing. As in many industries, the dimensional requirements for these extrudates continue to be narrowed, thereby making the manual deformation of these filters unacceptable. Specifically, the tolerances associated with the alignment of the internal cells of many ceramic extrudates must be closely held to assure proper shape and fluid flow therethrough. Further, the demand for cylindrically-shaped filter bodies has increased dramatically in recent years. The cylindrical shape of these filters makes it inherently difficult to manually handle the same. Moreover, cycle times associated with the manufacturing process are significantly effected by the non-uniform manual feeding process. Another problem associated with manual manipulation of the extrudates includes the variability of locating the ceramic extrudates in a position to be fired or cured without allowing deformation of the associate cells due to gravitational forces.

A manufacturing process is therefore desired that removes the inconsistencies associated with manual feeding of an extruded ceramic log or extrudate, including reducing the deformation of the extrudate during the forming process, increasing the precision of alignment of the extrudate prior to curing and/or firing, and decreasing cycle time.

SUMMARY OF THE INVENTION

One aspect of the present invention is to provide an apparatus for orienting sections of a plasticized ceramic extrudate that includes a marking assembly for applying an orientation reference mark to a plasticized ceramic extrudate exiting an extrusion die onto an extrudate support, and at least one extrudate-contacting orientation control member for correcting the orientation of the cut section of the extrudate on the extrudate support in response to misalignment of the reference mark. The apparatus also includes at least one gripping member adapted to laterally transfer the cut section of the extrudate along a linear path with respect to the extrudate support while preventing any orientation change of the cut section of the extrudate support. The apparatus further includes a visual inspection apparatus adapted to confirm the orientation of the cut section of the extrudate on the extrudate support.

Another aspect of the present invention is to provide a method for orienting sections of a plasticized ceramic extrudate that includes applying a reference mark to a plasticized extrudate as the extrudate exits the extrusion die into an extrudate support, and supporting the extrudate on the extrudate support. The method also includes cutting the extrudate to form a cut section of the extrudate, and correcting the orientation of the cut section of the extrudate in response to a reference mark misalignment and as the extrudate is supported by the extrudate support. The method further includes transferring the cut section of the extrudate along a length of the extrudate support while preventing any orientation change of the cut section, and visually inspecting the orientation of the cut section of the extrudate.

Yet another aspect of the present invention is to provide an apparatus for orienting sections of a plasticized ceramic extrudate that includes a marking assembly for applying an orientation reference mark to a plasticized ceramic extrudate exiting an extrusion die onto the extrudate support, and at least one extrudate-contacting orientation control member for correcting the orientation of the cut section of the extrudate on the extrudate support in response to a misalignment of the reference mark.

Still another aspect of the present invention is to provide an apparatus for correcting deformation of a plasticized ceramic extrudate exiting an extrusion die that includes a support frame, and at least one extrudate-contacting deformable roller operably coupled to support frame and having an axis of rotation, wherein the axis of rotation is pivotable with respect to a movement and extrudate exiting an extrusion die, and wherein the roller is adapted to contact the extrudate and correct a corkscrew deformation of the extrudate exiting the extrusion die.

The present inventive methods and associated apparatus disclosed herein are highly consistent and repeatable, remove the inconsistencies associated with prior art methods and apparatus, reduce the deformation of the associated ceramic extrudates as manufactured via prior art systems and methods, increase the precision of alignment prior to curing and/or firing the associated extrudates, reduce manufacturing cycle times, and are particularly well adapted for the proposed use.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
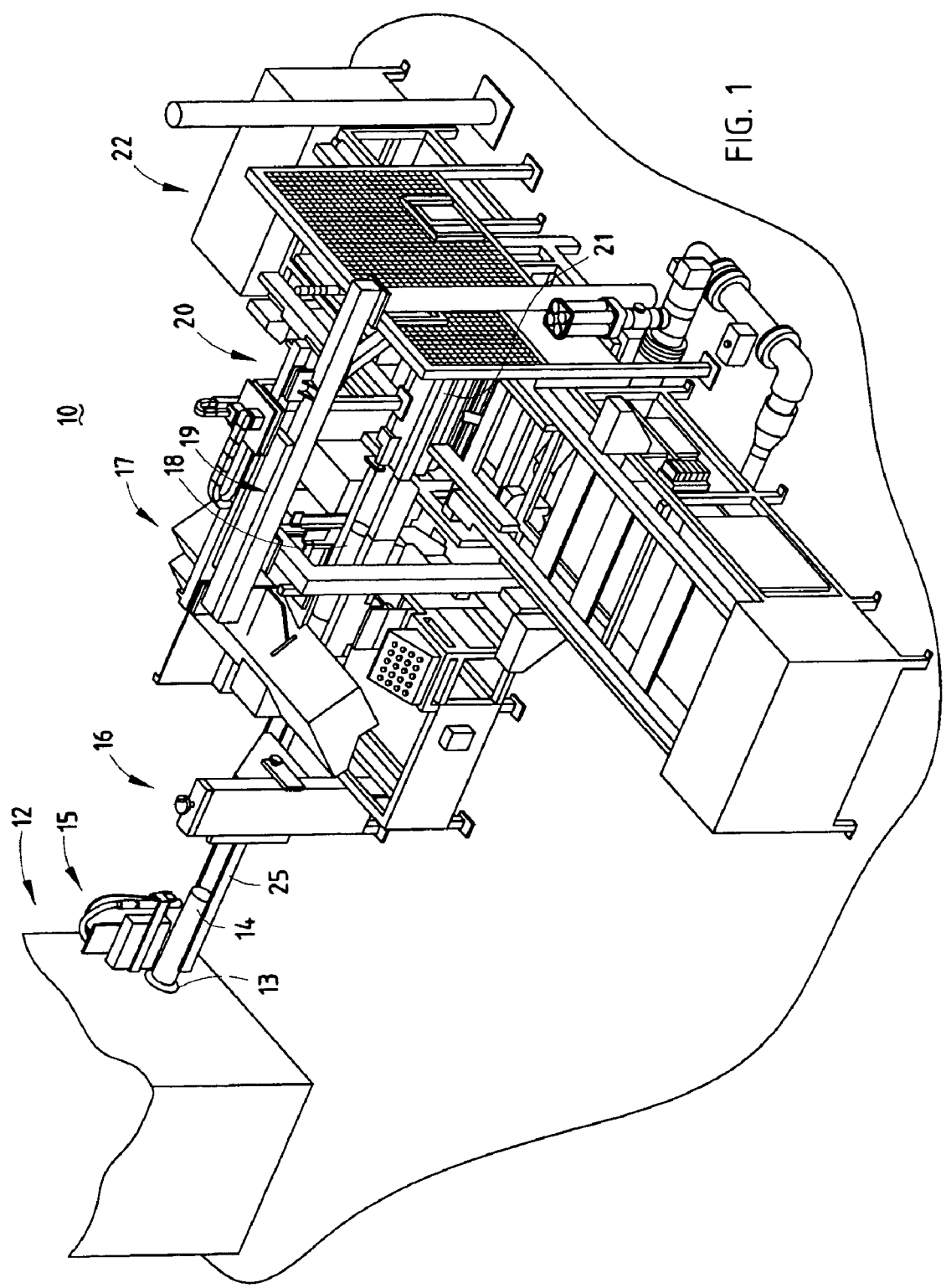
FIG. 1 is a perspective view of an extruded ceramic log transfer system embodying the present invention.
Figure 2:
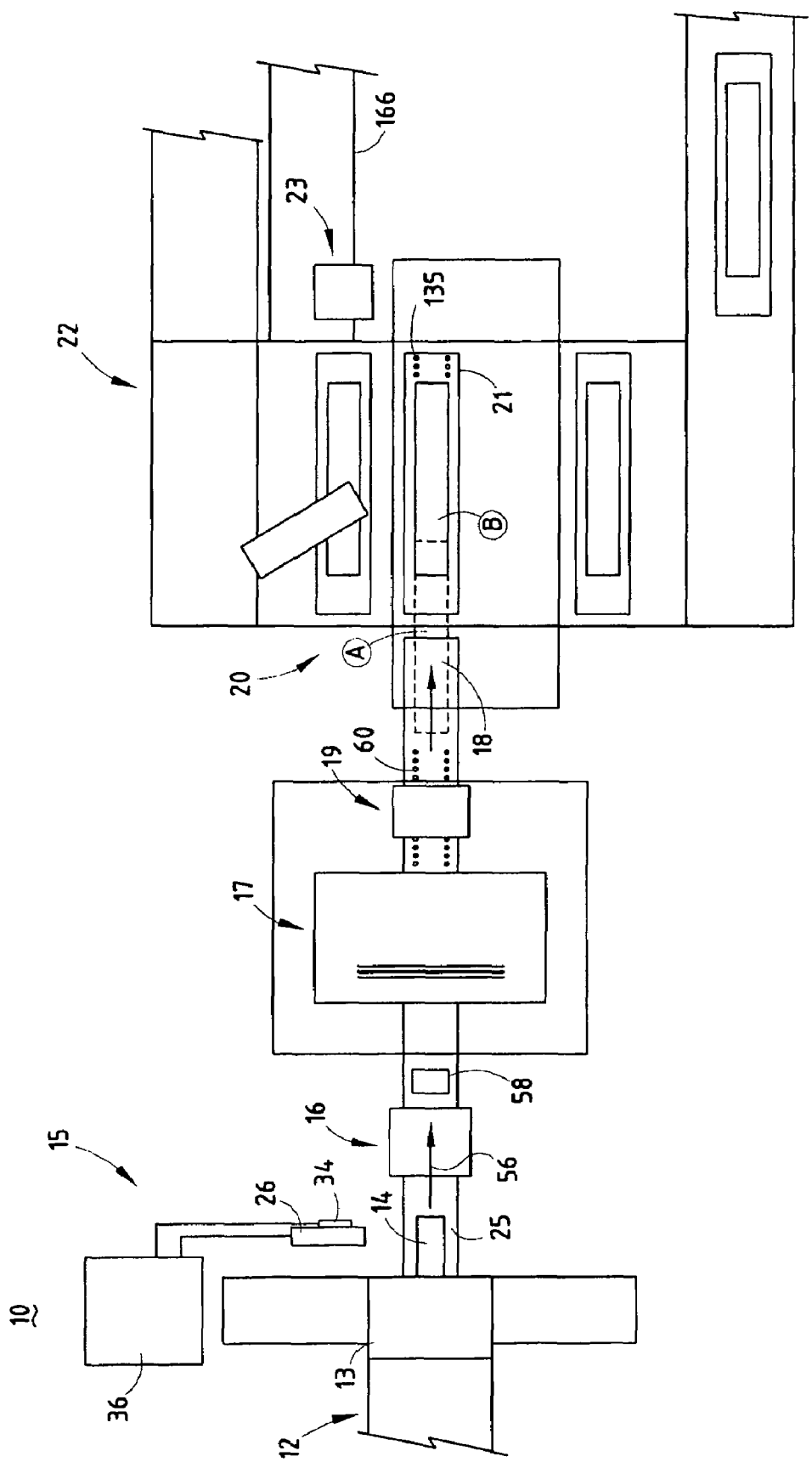
FIG. 2 is a top plan schematic view of the transfer system.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIGS. 1 and 2) generally designates an extruded ceramic log transfer system embodying the present invention. In the illustrated example, the transfer system 10 includes an extrusion apparatus 12 having an extrusion die 13 adapted to form a ceramic extrudate 14, and a continuous ink jet system or marking assembly 15 for continuously marking the extrudate 14 as it is extruded from the extrusion die 13 onto an extrudate support 25. The transfer system 10 also includes a corkscrew correction roller system or corkscrew correction assembly 16 that corrects a corkscrew deformation of the extrudate 14 as it is extruded through the extrusion die 13. The transfer system 10 further includes a wet saw assembly 17 that cuts a portion or segment 18 from the extrudate 14. An automatic log alignment system or orientation control system 19 is used to properly align the extrudate segment 18 in reference to a reference mark as provided by the inkjet system 15, as described below. A grab and drag system 20 is utilized to move the extrudate segment 18 in a linear path within the transfer system 10 and repositions the segment 18 from the extrudate support 25 onto a dryer tray 21 for movement along a conveyor system 22. A wet log alignment camera system or visual inspection system 23 is then utilized to monitor the alignment of the segment 18 as it rests on the associated dryer tray 21.

Figure 3A:
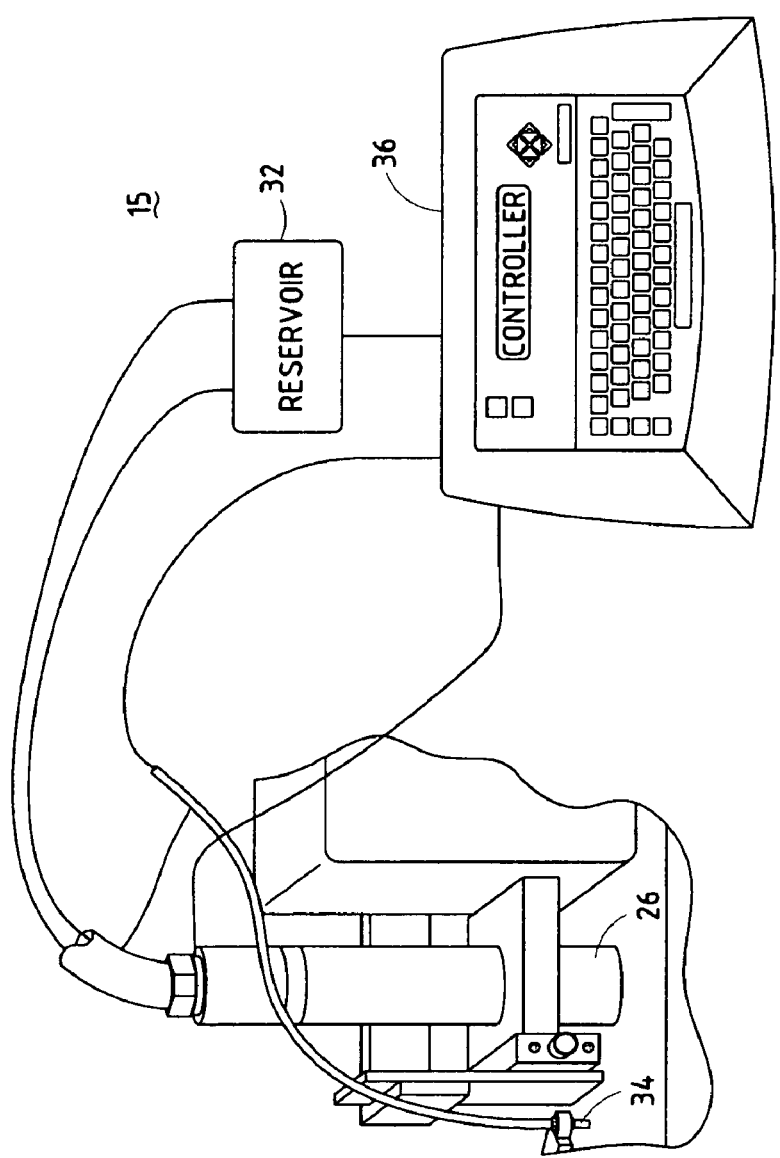
FIG. 3A is a partially schematic perspective view of a continuous ink jet system of the transfer system.
Figure 3B:
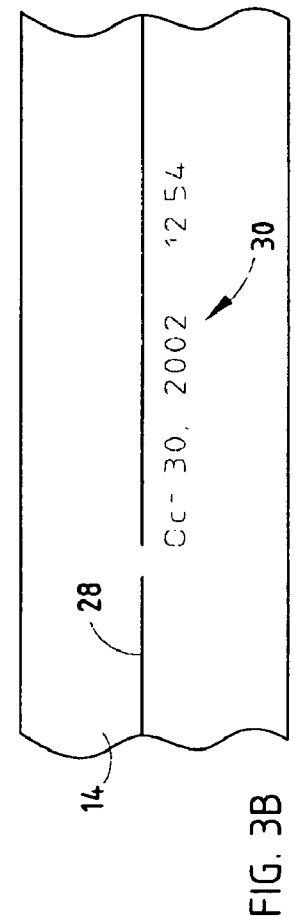
FIG. 3B is an extrudate including ink markings applied by the ink jet system.

The inkjet system 15 (FIG. 3) includes an inkjet print head 26 for printing an orientation reference mark 28 (FIG. 3B) on the extrudate 14 as the extrudate 14 is extruded from the extrusion die 13. The print head 26 may further be used to provide a date stamp 30 (or other information for traceability) on the extrudate 14 for the purpose of quality tracking and control. The print head 26 is in fluid communication with an ink reservoir 32. An optical reader or photo eye 34 is utilized to detect the presence of the extrudate 14. The print head 26 and the optical reader 34 are in operable communication with a controller 36 that receives the signals from the optical reader 34 and controls the print head 26 in response thereto. It should be noted that print head 26 is located as close as physically possible to the extrusion die 13 so as to accurately mark the extrudate 14 as it is extruded from the extrusion die 13 prior to deformation of the extrudate 14, such as the corkscrewing effect caused by the extrusion process. Preferably, the ink jet system 15 includes a Linx 4800 continuous inkjet unit as available from Diagraph of St. Charles, Mo., however, other inking systems may be utilized.

Figure 4:
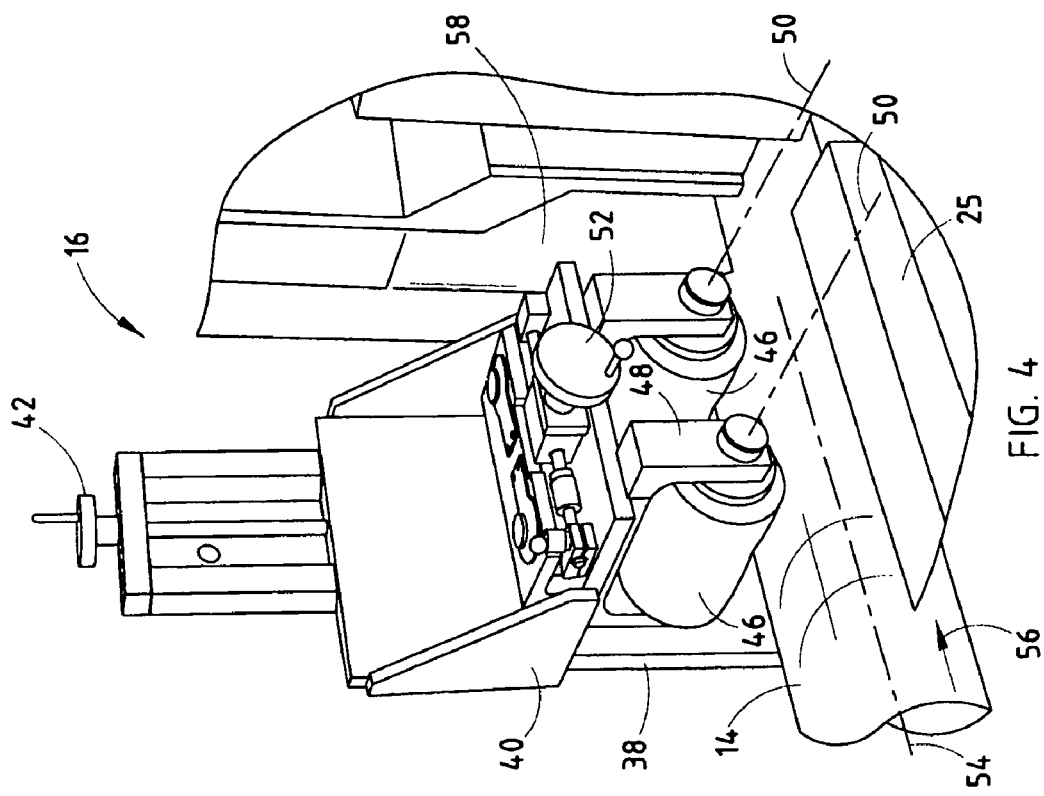
FIG. 4 is a perspective top view of a corkscrew correction roller system of the transfer system.

The corkscrew correction roller system 16 (FIG. 4) includes a frame 38 extending upwardly from the extrudate support 25, and a vertically adjustable support assembly 40. The vertical location of the support assembly 40 with respect to the extrudate support 25 is adjusted via a dial 42 operably connected to a threaded adjustment rod 44, that is in turn threadably coupled with the support assembly 40. A pair of elastically deformable rollers 46 are supported below the support assembly 40 via a pair of C-shaped hanging brackets 48. Each roller 46 is cylindrically shaped defining a pivot axis 50, and are preferably constructed of a material that will not cause deformation of an outer surface of the extrudate 14 while in contact therewith. The hanging brackets 48 are operably coupled to the support assembly 40 such that the rotation of an adjustment handle 52 causes the pivot axis 50 of the rollers 46 to move out of perpendicular alignment with a centroidal axis 54 of the extrudate 14.

In operation, the extrusion die 13 is known to cause a corkscrew deformation of the extrudate 14 as the extrudate 14 is extruded therefrom. As the extrudate 14 moves along the extrudate support 25 in a direction as represented and indicated by arrow 56, the corkscrew deformation of the extrudate 14 as caused by the extrusion die 13 is corrected by contacting the rollers 46 with an outer surface of the extrudate 14. Specifically, the pivot axis 50 of each roller 46 is adjusted via the adjustment handle 52 such that the rollers impinge on the outer surface of the extrudate 14 in a direction that causes a counter rotation to the corkscrew deformation. In other words, looking down vertically from above the extrudate 14, if there is no corkscrew to be corrected for, the pivot axis 50 is perpendicular to the axis 54 of extrudate 14. If, on the other hand, there is corkscrew present in the extrudate 14, the pivot axis 50 is askew from perpendicular to the axis 54 of extrudate 14, to thereby cause counter rotation to the corkscrew deformation. It should be noted that the correction of the corkscrew deformation is conducted prior to the extrudate 14 being cut into the segments 18, thereby eliminating the requirement to support a free extrudate segment 18 while attempting to correct for the corkscrew deformation.

A laser encoder 58 is utilized to monitor the extrusion velocity, i.e., the velocity that the extrudate 14 is extruded from the extrusion apparatus 12. The velocities as read by the laser encoder 58 are relayed to a controller 59, that may be included within a central control system, where the velocity readings are utilized to time and sequence the grab and drag system 20 as well as other subsequently completed steps and procedures. A wet saw 17 is then utilized to cut the extrudate segments 18 from the continuous extrudate 14. As wet saws are generally well known in the art, a detailed description of the same is not provided.

Figure 5:
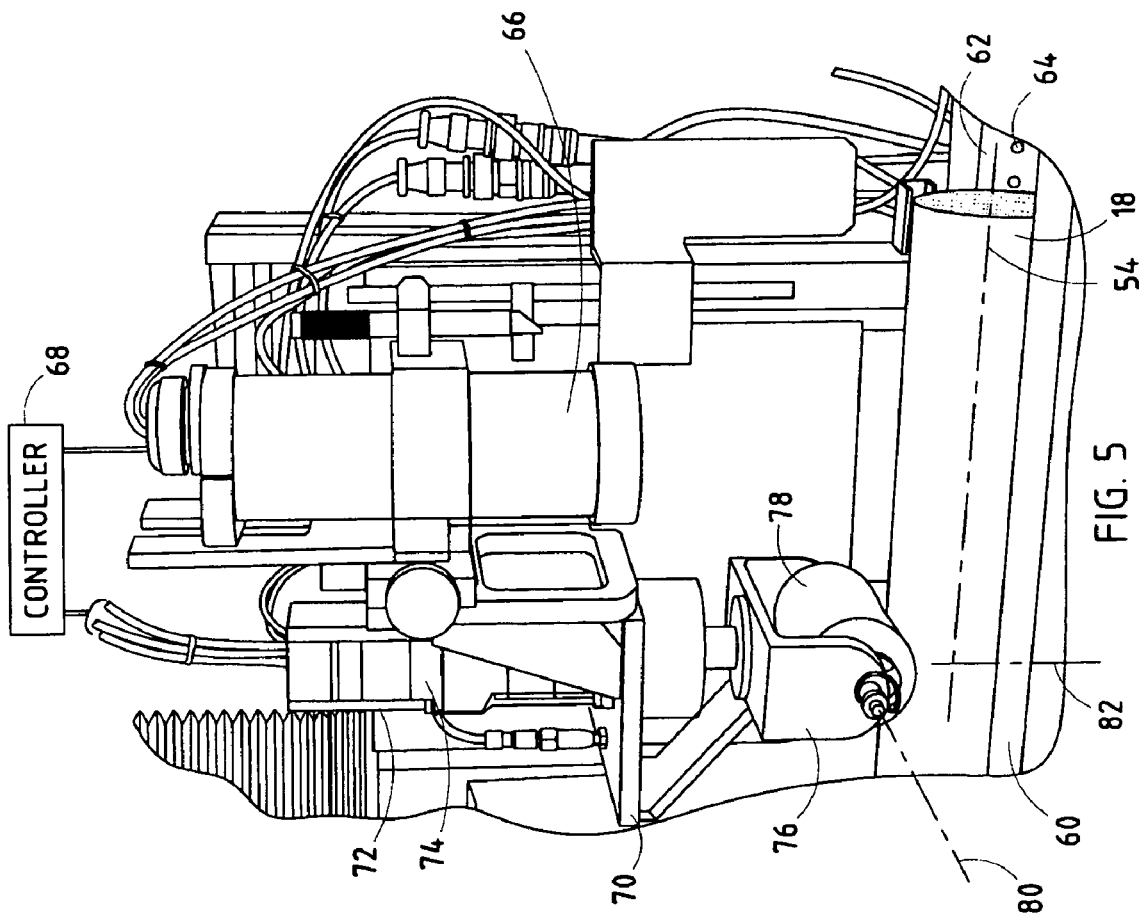
FIG. 5 is a partially schematic perspective view of an automatic log alignment system of the transfer system.

The automatic log alignment system 19 (FIG. 5) includes an air bearing 60 having a bearing surface 62 upon which the extrudate segment 18 is free to float once cut from the continuous extrudate 14. The bearing surface 62 includes a plurality of air jet apertures through which a continuous supply of forced air is exerted therethrough to floatingly support the segment 18 thereon once the segment 18 is cut from the continuous extrudate 14. The alignment system 19 also includes a camera system that takes an optical reading of the reference mark 28 and communicates the same with a controller 68, which may be included within a central control system. The controller 68 is in operable communication with an alignment assembly that includes a servo motor 72 operably coupled with a gear box 74, that is in turn coupled with a support assembly 76 that pivotally supports an elastically deformable roller 78 such that the pivotal axis 80 of the roller 78 can be pivoted about a vertical axis 82. The roller 78 is preferably constructed of a material that does not cause deformation of the segment 18 when in contract therewith, such as a foam.

In operation, the camera system 36 monitors the position of the reference mark 28 and communicates those readings with the controller 68 where the position of the reference mark 28 is compared with a predetermined reference point. Should misalignment occur, the controller 68 operates the servo motor 72 to pivot the support assembly 76 about the axis 82, thereby moving the pivot axis 80 out of perpendicular alignment with the centroidal axis 54 and causing the segment 18 to pivot about the centroidal axis 54.

Figure 6:
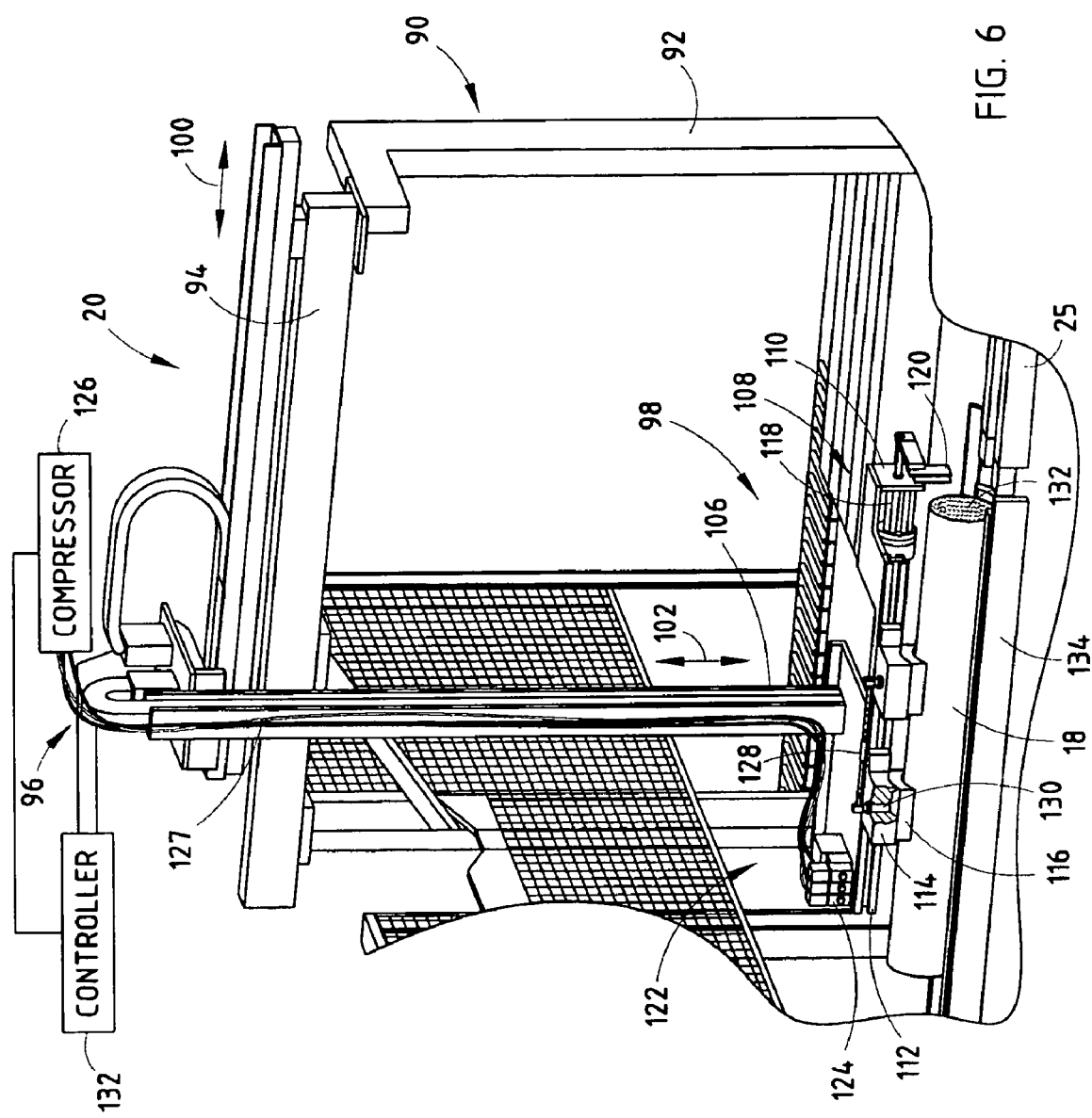
FIG. 6 is a partially schematic perspective view of an automatic grab and drag system of the transfer system.

The grab and drag system 20 (FIG. 6) includes an overhead frame assembly 90, a two-axis gantry drive system 96 supported by the frame assembly 90, and transfer system 98 supported by the drive system 96. The frame assembly 90 includes a pair of vertical members 92 that support a horizontally-extending track member 94. The drive system 96 includes a plurality of servo motors and gear assemblies to move the transfer assembly in a horizontal path 100 with respect to the extrudate support 25, and to adjust the vertical location of the transfer system 98 with respect to the extrudate support 25 along a vertical path 102. A downwardly-extending support arm 106 supports the transfer system 98 above the extrudate support 25. The transfer system 98 includes a frame 108 fixedly connected to the support arm 106 and having a proximate end 110, a distal end 112, and a pair of pad support portions 114 extending outwardly from a side of the frame 108 between the proximate end 110 and the distal end 112. Each pad support 114 supports an extrudate segment contacting pad 116 therebelow. Each pad 116 is preferably constructed of a flexibly resilient foam and is arcuately contoured. The arcuate shape is preferably substantially similar to the arcuate shape of the outer surface of the extrudate segment 18. A pneumatic cylinder 118 is fixedly connected to the frame 108 beneath the proximate end 110 thereof. A rear paddle 120 is connected to the operable end of the pneumatic cylinder 118 and is adapted to contact an end of the extrudate segment 18 as described below. The transfer system 98 further includes a compressed air system 122 having a plurality of switches 124 in operable communication with an air source such as a compressor 126 via a plurality of fluid lines 127. The air system 122 further includes a plurality of air lines 128 in fluid communication with heads 130 extending through each pad support 114 of the frame 108. The purpose of the compressed air system is to enable the pads 116 to periodically be "blown out" to remove any debris that may accumulate on the pads during periods of transfer. Preferably, such blowing out of the pads 116 occurs when the pads are not in contact with an extrudate segment 18, e.g., when the pads are returning to the pick position to engage another extrudate segment 18.

In operation, the controller 132 adjusts the location and height of the transfer system 98 with respect to the extrudate support 25 and begins its horizontal movement. Once a gap is generated between extrudate segment 18 and extrudate 14, the rear paddle 120 is positioned behind a trailing end 132 of the extrudate segment 18. The pneumatic cylinder 118 is then utilized to help ensure containment of the extrudate segment 18 with the transfer system 98 by moving the rear paddle 120 inward to contact with the trailing end 132 of the extrudate segment 18. The extrudate is transferred laterally via. a frictional force between the pads 116 and the segment 18. The extrudate segment 18 is then moved in a linear path along the continuous air bearing 60 from the extrudate support 25, position A, to a dryer tray 134, position B, also including an air bearing 135. The air bearing is shut off and the extrudate segment 18 rests on the dryer tray 134. During the return of the transfer system 98 to its original position, a short burst of air from the compressed air system 122 is provided through the pad supports 114 and foam pads 116 to help eliminate any debris.

Figure 7:
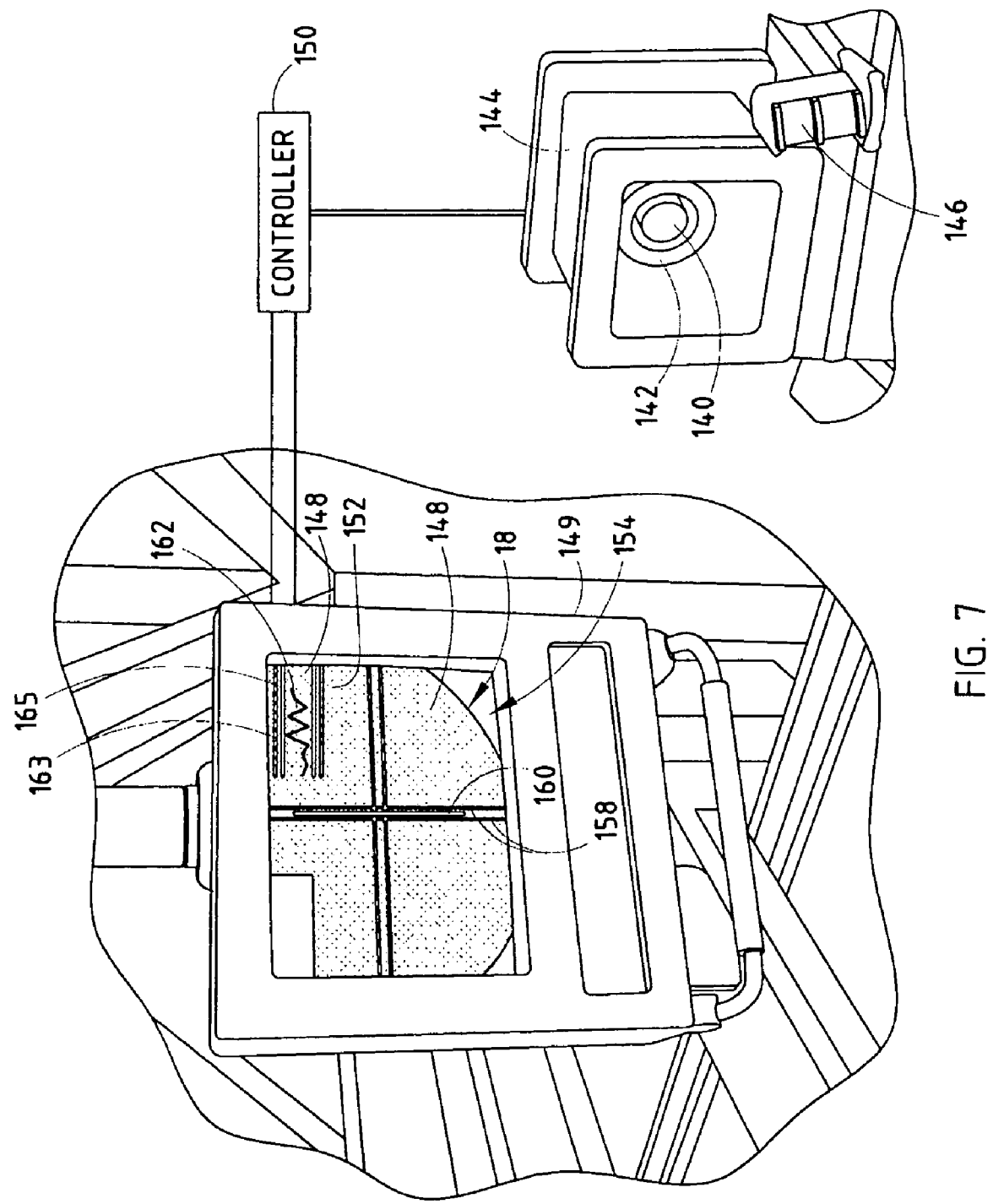
FIG. 7 is a partially schematic top perspective view of a log alignment camera system of the transfer system.

The wet log alignment camera system 23 (FIG. 7) includes a camera 140 and an LED ring light 142 mounted within an housing 144, and a photo-eye 146. The camera 140 takes an image of an end 148 of the extrudate segment 18 resting on the dryer tray 134 as the extrudate segment 18 passes by the photo-eye 146 and while the end 148 of the extrudate segment 18 is illuminated by the LED ring light 142. The image as produced, which includes a section of the end 148 that includes at least twenty-five walls 152, is communicated with a controller 150 that compared the measured image with a target range for alignment and displays relative information on a display monitor 149 where it is reviewed by the system operator. The controller 150 compares the alignment of the cell structure of the extrudate segment 18 to a predetermined range, as the alignment of the cell structure of each extrudate segment 18 must be closely monitored to ensure proper alignment so as to prevent deformation of the associated cell structure during curing and/or firing. Specifically, the walls 152 cell structure of each segment 18 must be positioned at an angle relative to an absolute vertical/horizontal to eliminate or reduce the amount of deformation, i.e., sagging, of the cell structure as the segment 18 is cured. Preferably, the alignment of the cell structure of the segment 18 is kept within a range of ±3.0°, more preferably within a range of ±2.8°, and most preferably within a range of ±1.8°. In a preferred embodiment, the wet log alignment camera system includes a second camera which takes an image of the end of extrudate 18 which is opposite the end the first camera images. In this way, the images from the two ends can be averaged by a computer, so that, in effect, the resultant image that is compared and/or displayed is an representation of the center region of the extrudate. Likewise, the difference between the images from the two ends can be used to report both the direction and the magnitude of the corkscrew of the extrudate 18, which can then be used to define the corkscrew correction requirements via an associated adjustment of the corkscrew correction roller system 16.

This information is relayed to the system operator via a color coded alignment matrix 154 on the display monitor 149. The alignment matrix 154 includes a pair of vertical and horizontal alignment bars for reference, and an indicator bar 160 representing the measured reading from the extrudate segment 18 being monitored. The video monitor 149 also displays a plot 162 of the previous nine readings plus the current reading, thereby allowing the system operator to monitor any progressing trends in the system. The plot 162 includes an outer pair of alignment bars 163 representing the ±2.8° alignment range, and an inner pair of alignment bars 165 representing the ±1.8° range. The system 10 is also configured to automatically divert those segments 18 failing to fall within the acceptable range to an auxiliary path 166 separate from the main conveyor line. Alternatively, the system 10 is configured to require operator removal of the failing segment 18. A closed loop control system is preferably included which allows for automatic adjustment of the automatic log alignment system 19 controller 68 based on the results of the wet log alignment camera system 23 measurements.

The present inventive methods and associated apparatus disclosed herein are highly consistent and repeatedly remove the inconsistencies associated with prior art methods and apparatus, reduce the deformation of the associated ceramic extrudates as manufactured via prior art systems and methods, increase the precision of alignment prior to curing and/or firing the associated extrudates, reduce manufacturing cycle times, and are particularly well adapted for the proposed use.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A method for orienting sections of a plasticized ceramic extrudate, comprising:

applying a reference mark to a plasticized extrudate as the extrudate exits an extrusion die onto an extrudate support;

contacting a surface of the extrudate with elastically deformable rollers having pivot axes aligned askew from an extrudate axis of movement along the extrudate support to correct corkscrew deformation of the extrudate exiting the extrusion die in response to a reference mark misalignment, said correcting being prior to the extrudate being cut to form a cut section of the extrudate and without deformation of an outer surface of the extrudate;

cutting the extrudate to form the cut section of the extrudate;

floatingly supporting the cut section of the extrudate on an air bearing;

taking an optical reading of the reference mark on the cut section of the floatingly supported extrudate and correcting misalignment of the reference mark from a predetermined reference point;

transferring the cut section of the extrudate laterally via frictional force to a dryer tray; and imaging an end of the cut section of the extrudate on the dryer tray and comparing the image with a target range for alignment.

2. The method of claim 1 wherein the reference mark applying step comprises applying an ink jet mark to the extrudate.

3. The method of claim 1 wherein the step of correcting misalignment of the reference mark from a predetermined reference point comprises contacting a surface of the cut section of extrudate with a pivotally supported elastically deformable roller having a pivot axis oriented out of perpendicular alignment with a centroid axis of the cut section of extrudate.

4. The method of claim 1 wherein the step of transferring the cut section of the extrudate laterally via frictional force comprises contacting the cut section with pad supports constructed of a flexibly resilient foam.

5. The method of claim 1 wherein the imaging step comprises imaging first and second ends of the extrudate.

* * * * *